United States Patent
Ritzén et al.

(10) Patent No.: US 7,054,635 B1
(45) Date of Patent: May 30, 2006

(54) CELLULAR COMMUNICATIONS NETWORK AND METHOD FOR DYNAMICALLY CHANGING THE SIZE OF A CELL DUE TO SPEECH QUALITY

(75) Inventors: Benny Ritzén, Stockholm (SE); Patrik Cerwall, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/189,099

(22) Filed: Nov. 9, 1998

(51) Int. Cl.
   *H04Q 7/20* (2006.01)

(52) U.S. Cl. .................. 455/444; 455/437; 455/67.13; 455/453; 455/63.2

(58) Field of Classification Search ............... 455/422, 455/423, 424, 445, 458, 436–444, 450–454, 455/501–506, 515–517, 63.1–67.7
See application file for complete search history.

(56) References Cited

U.S. PATENT DOCUMENTS

| | | | | |
|---|---|---|---|---|
| 4,670,899 A | * | 6/1987 | Brody et al. ............... | 455/453 |
| 5,241,685 A | | 8/1993 | Bodin et al. ............... | 455/33.2 |
| 5,323,446 A | * | 6/1994 | Kojima et al. ............. | 379/60 |
| 5,455,967 A | | 10/1995 | Amezawa et al. ......... | 455/69 |
| 5,475,861 A | | 12/1995 | Hall ........................... | 455/33.1 |
| 5,475,868 A | * | 12/1995 | Duque-Anton et al. .... | 455/62 |
| 5,499,386 A | * | 3/1996 | Karlsson .................... | 455/444 |
| 5,499,395 A | | 3/1996 | Doi et al. ................... | 455/33.1 |
| 5,504,938 A | | 4/1996 | Redden ...................... | 455/33.4 |
| 5,561,841 A | * | 10/1996 | Markus ....................... | 455/446 |
| 5,613,203 A | * | 3/1997 | Dupuy et al. .............. | 455/444 |
| 5,640,677 A | * | 6/1997 | Karlsson .................... | 455/434 |
| 5,701,585 A | | 12/1997 | Kallin et al. .............. | 455/33.2 |

(Continued)

FOREIGN PATENT DOCUMENTS

| | | |
|---|---|---|
| EP | 0 182 027 | 5/1986 |
| GB | 2 281 011 | 2/1995 |

(Continued)

OTHER PUBLICATIONS

U.S. Appl. No. 09/189,088, filed Nov. 9, 1998, Related U.S. Application.

(Continued)

*Primary Examiner*—Charles Craver

(57) ABSTRACT

A method and cellular communications network is provided that improves the speech quality near a border of a cell by dynamically changing the size of the cell. More specifically, the method includes the steps of selecting a cell from a plurality of cells, and receiving a plurality of mobile reports from a corresponding number of mobile terminals located in a portion (e.g., cell border area or a section of the cell border area) of the cell. In response to receiving the plurality of mobile reports, an average speech quality value is determined for the portion of the cell. The portion is decreased in size if a lower threshold exceeds the average speech quality value or the portion is increased in size if the average speech quality measure exceeds an upper threshold.

25 Claims, 4 Drawing Sheets

U.S. PATENT DOCUMENTS

| | | | |
|---|---|---|---|
| 5,722,044 A | 2/1998 | Padovani et al. | 455/33.1 |
| 5,740,537 A | 4/1998 | Beming et al. | 455/450 |
| 5,754,959 A | 5/1998 | Ueno et al. | 455/453 |
| 5,784,360 A | 7/1998 | I et al. | 370/252 |
| 5,790,955 A | 8/1998 | Tomoike | 455/453 |
| 5,793,805 A * | 8/1998 | Nikides | 375/224 |
| 5,884,178 A * | 3/1999 | Ericsson et al. | 455/441 |
| 5,898,682 A * | 4/1999 | Kanai | 370/331 |
| 6,006,093 A * | 12/1999 | Aalto et al. | 455/443 |
| 6,119,018 A * | 9/2000 | Kondo | 455/522 |

FOREIGN PATENT DOCUMENTS

| | | |
|---|---|---|
| GB | 2 311 191 | 9/1997 |
| WO | WO 98/16029 | 4/1998 |

OTHER PUBLICATIONS

PCT Search Report, dated Feb. 17, 2000.
Standard EPO Search Report, Jul. 20, 1999.

* cited by examiner

CELLULAR COMMUNICATIONS NETWORK AND METHOD FOR DYNAMICALLY CHANGING THE SIZE OF A CELL DUE TO SPEECH QUALITY

CROSS REFERENCE TO RELATED APPLICATIONS

This application is related to a U.S. Application entitled "Cellular Communications Network and Method for Maintaining Speech Quality by Controlling the Admission of a New Call" Ser. No. 09/189,088 which is hereby incorporated by reference herein. The U.S. Application was filed on Nov. 9, 1998 in the names of Benny Ritzén and Patrik Cerwall and assigned to Telefonaktiebolaget LM Ericsson.

BACKGROUND OF THE INVENTION

1. Technical Field of the Invention

The present invention generally relates to the telecommunications field and, in particular, to a cellular communications network and method for improving the speech quality near a border of a cell by dynamically changing the size of the cell.

2. Description of Related Art

In order to improve the radio environment of today's cellular communications networks, many operators utilize automated planning techniques (e.g., Adaptive Frequency Allocation) to assist with frequency planning and cell assignment decisions that improve the speech quality within the network by minimizing interference. The current automated planning techniques are defensively designed and have large safety margins to ensure that "good" speech quality is maintained throughout the entire cellular telecommunications network. Consequently, it is very expensive to use the current automated cell planning techniques to ensure that "good" speech quality is maintained throughout the entire cellular telecommunications network. In addition, the current automated cell planning techniques may increase the already high costs due to the large safety margins by requiring the addition of new cells which may not necessarily be required to improve speech quality.

Moreover, the current automated cell planning techniques use complicated frequency hopping or power control schemes to try and average out or reduce the high interference present within the entire cellular communications network. Unfortunately, none of the current automated cell planning techniques attempt to improve the speech quality near a border of a cell by dynamically changing the size of the cell.

Accordingly, there is a need for a method in a cellular communications network that improves the speech quality near a border of a cell by dynamically increasing or decreasing the size of the cell. There is also a need for a method and cellular communications network that dynamically decreases the size of an interfering cell to increase the speech quality within a cell interfered with by the interfering cell. These and other needs are satisfied by the cellular communications network and method of the present invention.

SUMMARY OF THE INVENTION

The present invention is a method and cellular communications network that improves the speech quality near a border of a cell by dynamically changing the size of the cell. More specifically, the method includes the steps of selecting a cell from a plurality of cells, and monitoring a plurality of mobile reports already received from a corresponding number of mobile terminals located in a portion (e.g., cell border area or a section of the cell border area) of the cell. In response to monitoring the plurality of mobile reports, an average speech quality value for both uplink and downlink is determined for the portion of the cell. The portion is decreased in size if the average speech quality value exceeds a lower threshold for the uplink and/or downlink, or the portion is increased in size if the average speech quality value exceeds an upper threshold for the uplink and/or downlink.

In accordance with the present invention, there is provided a method and cellular communications network that effectively changes the size of a cell by adjusting a border offset parameter or a hierarchical cell structure threshold value.

Also in accordance with the present invention, there is provided a method and cellular communications network that effectively decreases the size of an interfering cell that causes interference within a cell to further improve the speech quality in that cell.

In accordance with the present invention, there is provided a method and cellular communications network that effectively improves the speech quality value in a cell by actively allocating a channel during call setup or handover by means of intra-cell handover on a Broadcast Control Channel frequency used within an interfering cell.

Further in accordance with the present invention, there is provided a method and cellular communications network capable of operating in accordance with any telecommunications standard that supports mobile assisted handovers such as, for example, the Global System for Mobile Communications (GSM) standard.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
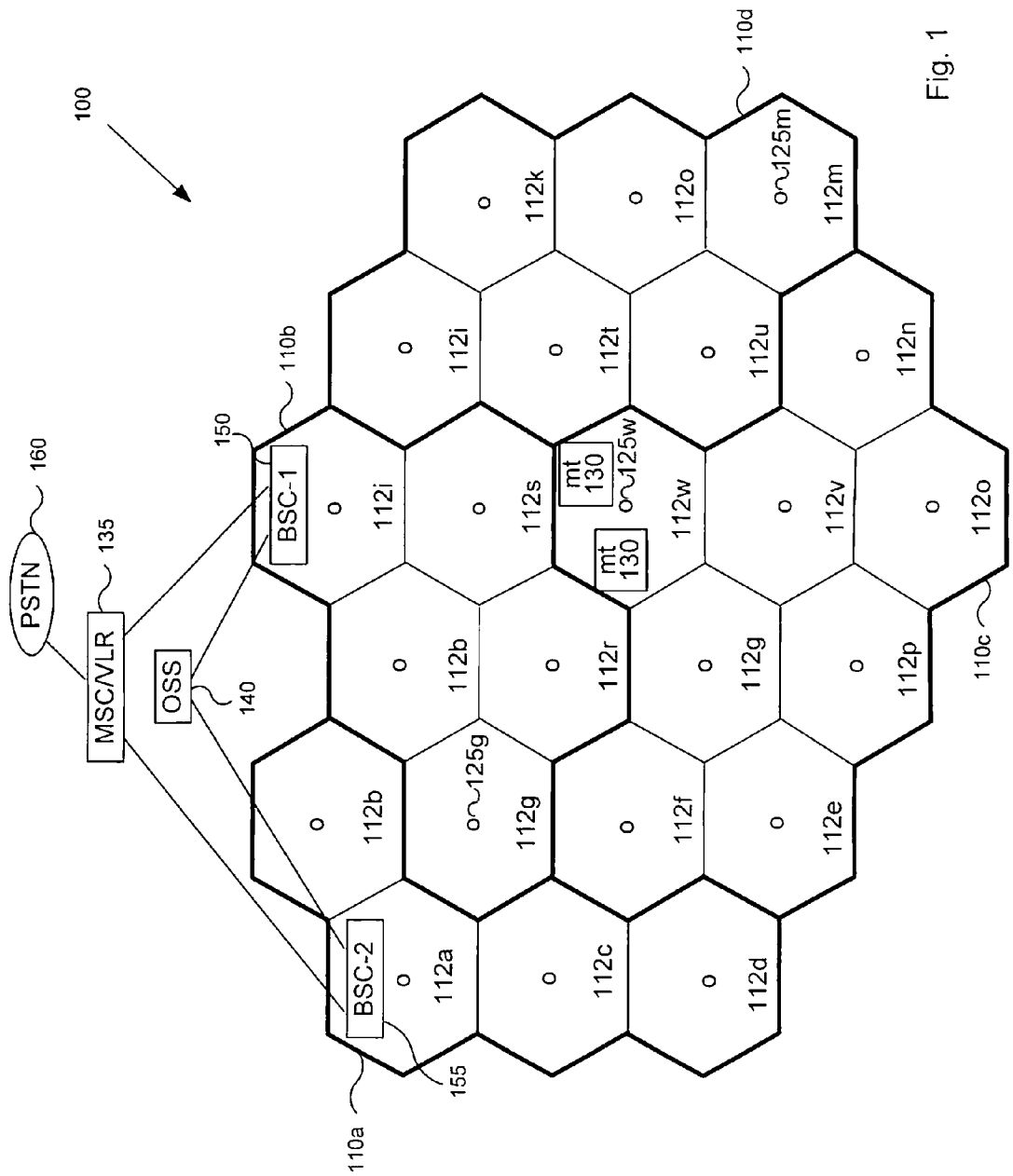
FIG. 1 is a simplified diagram of an exemplary cellular communications network used to implement a preferred method for improving the speech quality near a border of a cell by dynamically changing the size of the cell in accordance with the present invention.

Referring to the Drawings, wherein like numerals represent like parts throughout FIGS. 1–6, there are disclosed an exemplary cellular communications network 100 (FIGS. 1–5) and a preferred method 600 (FIG. 6) in accordance with the present invention.

Although the cellular communications network 100 will be discussed with reference to the Global System for Mobile Communications (GSM) standard, those skilled in the art will appreciate that other standards and specifications may also utilize the principles of the present invention especially if they support mobile assisted handover (MAHO) technology. Accordingly, the cellular communications network 100 described should not be construed in such a limited manner.

In order to better describe the present invention, a detailed description about the method 600 used by the cellular communications network 100 will be deferred pending a discussion about the general architecture of the cellular telecommunications network.

Referring to FIG. 1, there is illustrated the general architecture of the exemplary cellular communications network 100 used to implement the preferred method 600. It should be noted that the illustrated configuration of the cellular communications network 100 utilizing a hierarchical cell structure is only one of many possible configurations that may form the network.

The cellular communications network 100 utilizing the hierarchical cell structure includes a set of large cells 110a–110d and a set of small cells 112a–112w that effectively divide an arbitrary geographic area into a plurality of radio coverage areas having two hierarchical layers. The large cells 110a–110d represent a higher hierarchical level, and the small cells 112a–112w represent a lower hierarchical level that can provide extra "hot spot" capacity within the cellular communications network 100. It should be understood that the cellular communications network 100 can be configured to include more hierarchical layers in addition to the two hierarchical layers provided by the large cells 110a–110d and the small cells 112a–112w.

The hierarchical cell structure of the cellular communications network 100 represented by the large cells 110a–110d and the small cells 112a–112w enables a controlled passage or handover of a cellular call between the two hierarchical layers. Each hierarchical layer is assigned a signal strength threshold that is used in determining when to perform the handover of the cellular call to or from a particular hierarchical level. For example, when the signal strength in the small cell (e.g., small cell 112b) of the lower hierarchical level falls below the signal strength threshold for that level and below that of a neighbor cell from a higher level, a handover of the cellular call to the large cell (e.g., large cell 110a) in the higher cell level is performed so long as no other small cell (e.g., small cell 112a) in the lower hierarchical layer is able to accept the cellular call. Thereafter, no handover is performed back to the small cells 112a–112w of lower hierarchical level until one of the small cells indicates a signal strength above the corresponding signal strength threshold.

A single base transceiver station (BTS) (e.g., base transceiver station 125w) is positioned within each cell (e.g., small cell 112w) for transmitting and receiving mobile communications to and from mobile terminals (e.g., mobile terminals 130). Different groups of cells (e.g., large cells 110b–110d and small cells 112e–112w) are then associated with a particular base station controller (e.g., BSC-1 150). A number of BSCs (e.g., BSC-1 150 and BSC-2 155) may, in turn, be associated with a mobile services switching center/visitor location register 135 (e.g., MSC/VLR 135) and an operation support system 140 (e.g., OSS 140). The OSS 140 provides an operator with supervisory functions for operating and maintaining the cellular communications network 100.

As an illustration, the BSC-1 150 provides mobile service for the large cells 110b–d and small cells 112e–112w, while the BSC-2 155 provides mobile service for the large cell 110a and small cells 112a–112d. The BSC-1 150 and BSC-2 155 are in turn coupled to the MSC/VLR 135, which generally functions as an interface between the cellular telecommunications network 100 and an external telephone/data communication system such as, for example, a public switched telephone network (PSTN) 160.

Figure 3:
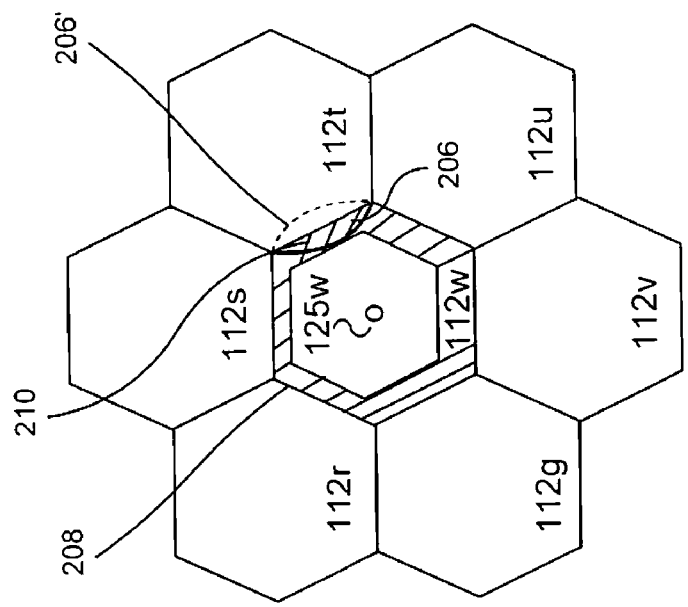
FIGS. 2 and 3 are simplified diagrams of the cell and associated neighboring cells from the cellular communications network of FIG. 1 in which the size of the cell is decreased (FIG. 2) or increased (FIG. 3) depending on an average speech quality value within the cell.
Figure 2:
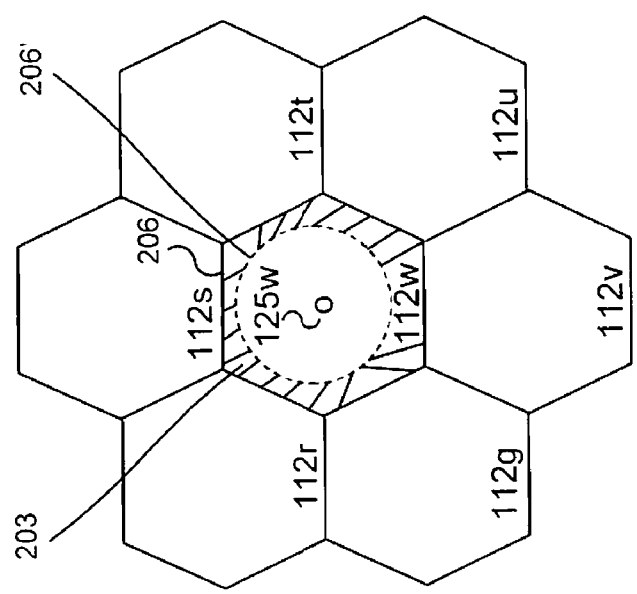

Referring to FIGS. 2 and 3, there are illustrated simplified diagrams of a cell (e.g., small cell 112w) and associated neighboring cells (e.g., small cells 112q–v) from the cellular communications network 100 in which the size of the cell is decreased (FIG. 2) or increased (FIG. 3) depending on an average (or percentile) speech quality value. It should be understood that the size of any one or all of the large cells 110a–110d and the small cells 112a–112w can be increased and decreased utilizing the present invention, however for purposes of clarity, only the small cell 112w is described herein.

As an illustration, the average (or percentile) speech quality value (e.g., uplink speech quality and downlink speech quality) is derived for the small cell 112w using mobile reports (described below) received from the mobile terminals 130 located in a predetermined portion of the small cell and from the BTS 125w. The predetermined portion of the small cell 112w can include a cell border area 208 or a section 210 of the cell border area depending on the selection of a cell level approach or sub-cell level approach. The cell level approach uses mobile reports received from the mobile terminals 130 (FIG. 1) located in the cell border area 208, and the sub-cell level approach uses mobile reports received from mobile terminals 130 located in the section 210 of the cell.

In determining the average (or percentile) speech quality value for the uplink and downlink respectively, each mobile terminal (e.g., mobile terminal 130) continuously makes the following measurements: (1) the downlink signal strength from the cell (e.g., small cell 112w) currently serving the connection; (2) the downlink speech quality based on a bit error rate for a decoded digital signal from the cell currently serving the connection; and (3) a downlink signal strength from a number of cells (e.g., neighboring cell 112q–112v) that the mobile terminal can hear. In the GSM, the mobile terminal (e.g., mobile terminal 130) reports these measurements to the BTS (e.g., BTS 125w) every 0.48 seconds, and then the BTS operates to measure an uplink signal strength and uplink quality from the mobile station to complete the mobile report.

In other words, the mobile reports generally used to determine the average speech quality are from the mobile terminals located within a predetermined distance (e.g., dBs) to a non-cosited border 206, where a bit error rate is checked. The predetermined distance to the border 206 can be defined as a signal strength distance to a nominal border corrected by offsets for the cells located in the same hierarchical layer, or as the signal strength distance to a hierarchical cell structure (HCS) threshold for cells located in different layers (e.g., small cell 112w and large cell 110c).

After receiving the mobile reports in accordance to the cell level approach or the sub-cell level approach, the following analysis can be performed by the BSC-1 150, OSS 140 or MSC/VLR 135 to improve the speech quality in the small cell 112w (for example) by determining whether to decrease, increase or maintain the size of the cell border area 208 or the section 210 of the small cell 112w. First, if the average (downlink and/or uplink) speech quality value (or a percentile value) from the selected mobile reports from within the small cell 112w is worse than a lower threshold then the portion (e.g., cell border area 208 or section 210) of the small cell is decreased in size by adjusting at least one border offset parameter (see FIG. 2 for an example the cell border area 208 being decreased), or by adjusting a hierarchical cell structure threshold value of the small cell to increase handovers of ongoing calls to another cell (e.g., large cell 110c) in a different layer of the cellular communications network 100.

Secondly, if the average (downlink and/or uplink) speech quality value (or a percentile) from the selected mobile reports from within the small cell 112w is greater than an upper threshold then the portion (e.g., cell border area 208 or section 210) of the small cell is increased in size by adjusting at least one border offset parameter (see FIG. 3 for an example of the section 210 being increased), or by adjusting the hierarchical cell structure threshold value of the small cell to decrease the handovers of ongoing calls to another cell (e.g., large cell 110c) in a different hierarchical layer of the cellular communications network 100.

The use of the lower threshold and the upper threshold in the analysis helps to introduce hysteresis into the cellular communications network 100. The hysteresis functions as a safety margin against fluctuating handover borders; for example, a low hysteresis resulting from the upper and lower thresholds being relatively close to one another yields a sharp limit for when to increase or decrease the size of a cell leading to a large amount of fluctuating handovers. In contrast, a high hysteresis resulting from the upper and lower thresholds being relatively far apart from one another yields a wider limit for when to decrease or increase a cell's size leading to a smaller amount and less fluctuating handovers.

In the event that the cell border 206 of the small cell 112w is moved (inward or outward) by changing the at least one border offset parameter then the neighboring cells (e.g., small cells 112q–112v) in the same layer should agree to change their corresponding border to accommodate the new size of the small cell 112w. Furthermore, there may exist a condition where a traffic load in the small cell 112w should be below a predetermined level before increasing the size of the small cell due to quality reasons. Another condition that may exist is where the size of the small cell 112w automatically decreases in size if the traffic load exceeds a predetermined threshold regardless if there are "good" speech quality values.

Figure 5:
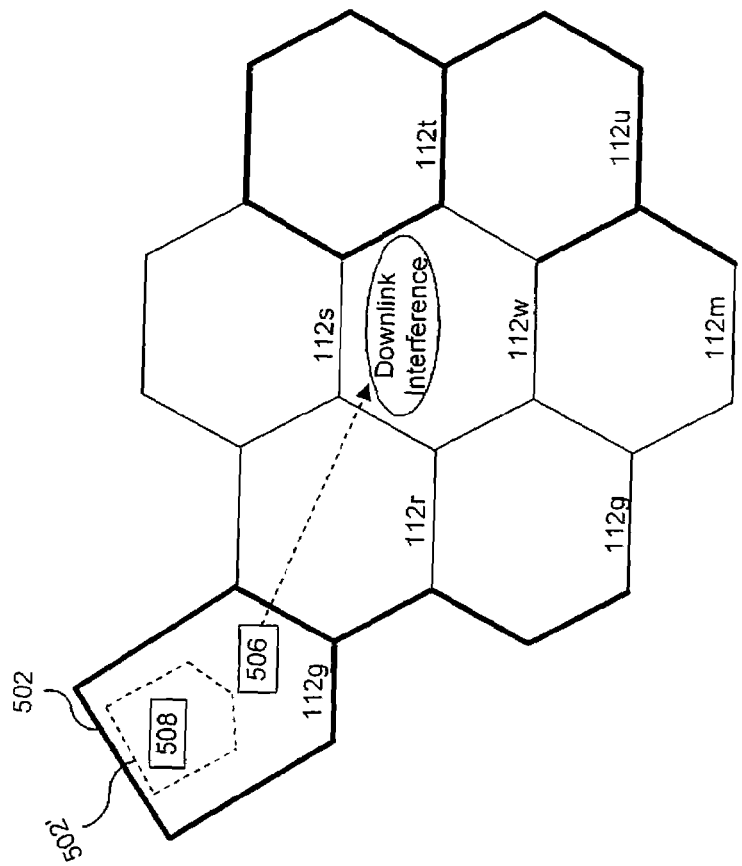
FIG. 5 is a simplified diagram of an interfering cell responsible for downlink interference within the cell of FIGS. 2 and 3 wherein the entire interfering cell is decreased in size to improve the average speech quality value in the cell.
Figure 4:
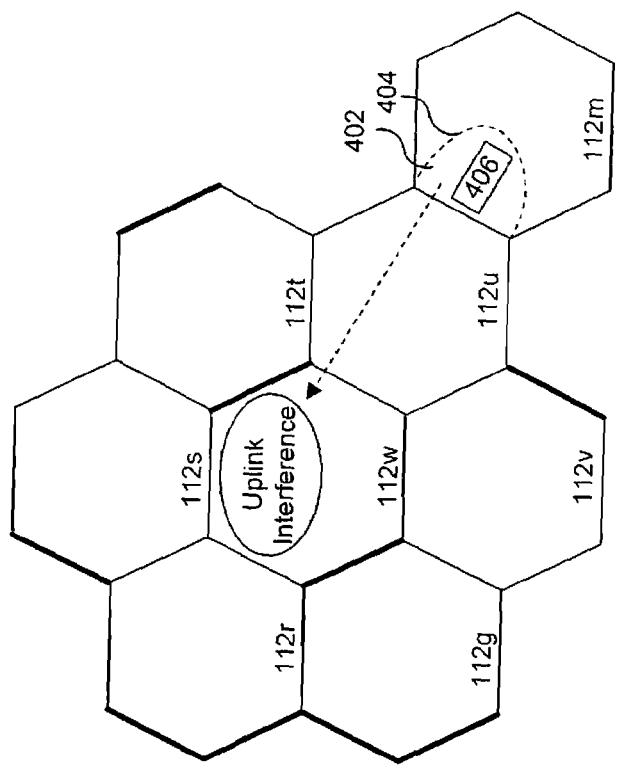
FIG. 4 is a simplified diagram of an interfering cell responsible for uplink interference within the cell of FIGS. 2 and 3 wherein a section of the interfering cell is decreased in size to improve the average speech quality value in the cell.

Referring to FIGS. 4 and 5, there are illustrated simplified diagrams of interfering cells (e.g., interfering cell 112m or 112g) that can be decreased in size to improve the speech quality in the small cell 112w. It should be understood that the present invention functions properly when changing only the size of the small cell 112w as described in FIGS. 2 and 3, but the invention can be expanded to include the determination of whether or not to decrease the size of the interfering cells (e.g., interfering cell 112g or 112m) to further improve the speech quality within the small cell.

Initially, there is a determination as to which cells (e.g., small cells 112a–112p and large cells 110a–110d) are the interfering cells that cause non-negligible interference within the small cell 112w. The interfering cell 112m or 112g (only two discussed) may be referred to as a co-channel cell and/or an adjacent channel cell, because the small cell 112w and the interfering cell both utilize the same channels or adjacent channels. In addition, the interfering cell 112m can be further classified as either an uplink interfering cell 112m (FIG. 4) or a downlink interfering cell 112g (FIG. 5).

The non-negligible uplink interference attributed to the uplink interfering cell 112m (see FIG. 4) and the non-negligible downlink interference attributed to the downlink interference cell 112g (see FIG. 5) can be estimated or measured. An example of how to estimate which cells are the interfering cells is disclosed in U.S. patent application Ser. No. 08/940,648 and entitled "Estimating Downlink Interference in a Cellular Communications System" which is hereby incorporated into this specification. This Patent Application describes a method for estimating downlink interference in a cellular communication network using a Broadcast Channel Allocation (BA) list to determine cell-to-cell interdependencies and to create an interference matrix.

More specifically, this Patent Application describes where the BA lists of the cellular communications network are modified so that the mobile terminals in the network can measure downlink interference on predetermined Broadcast Control Channel (BCCH) frequencies. These downlink interference measurements are essentially downlink signal strength measurements that can be made on the BCCH frequencies in all of the cells where the mobile terminals are located (e.g., the six strongest cells per mobile terminal for GSM). These downlink signal strength measurements are then reported back to a base station controller. Knowing the BCCH frequencies measured and the Base Station Identity Codes (BSICs) involved, the base station controller maps the reported measurements to the corresponding cells. The base station controller then uses this mapping from the reported downlink signal strength measurements to produce the cell-to-cell interference matrix. The interference matrix can describe the differences in path loss between most of the cells in the network or, alternatively, the interference matrix can describe the Carrier-to-Interference Ratio (C/I) or the Carrier-to-Adjacent Ratio (C/A) between those cells.

In the event the above-mentioned interference matrix is used to determine the downlink interfering cells (e.g., downlink interfering cell 112g), then the uplink interfering cells (e.g., uplinking interfering cell 112m), may be predicted to include all cells in which cell 112w cause non-negligible downlink interference. Because, it is likely that the cells that are interfered on the downlink by cell 112w also cause non-negligible uplink interference in cell 112w.

Referring now to FIG. 4, there is illustrated the uplink interfering cell 112m and the small cell 112w wherein a section 402 of the uplink interfering cell is reduced in size (see new cell border 404) to improve the speech quality in the small cell. More specifically, the mobile reports from the uplink interfering cell 112m are used to determine the particular section (e.g., section 402) that is decreased in size when "high" uplink interference above a predetermined threshold is detected in the small cell 112w. The "high" uplink interference detected in the small cell 112w is regarded to be due to mobile terminal(s) (e.g., mobile terminal 406) operating within the particular section 402 of an uplink interfering cell (e.g., cell 112m) if these mobile terminal(s) reports poor downlink quality in that cell. The reason is that if the mobile terminal(s) reports poor downlink quality it can be assumed that they also cause poor uplink quality in cell 112w.

The mobile reports and, more particularly, the BA list of the uplink interfering cell 112m should include the BCCH frequencies of the strongest interferers (e.g., small cell 112w) to the uplink interfering cell, this makes the mobile terminal 406 measure the frequencies associated with the small cell 112w. In addition, the mobile reports can also include the BCCH frequencies of the neighboring cells 112q–112v.

Therefore, the mobile reports of the uplink interfering cell 112m are used to identify the particular section 402 by looking at which neighboring cell (e.g., neighboring cell 112u) is the strongest neighboring cell in those mobile reports where also the signal strength of cell 112w is reported. In decreasing the size of the section 402, the mobile terminal(s) 406 located in the section 402 are moved (e.g., handovers) to the strongest neighboring cell 112u resulting in a decrease of the uplink interference in the small cell 112w. On the other hand, instead of decreasing the size of the section 402 of the uplink interfering cell 112m, the hierarchical cell structure threshold value of the uplink interfering cell can be adjusted to increase the handovers of ongoing calls to another cell (e.g., large cell 110d) in a different hierarchical layer of the cellular communications network 100.

Referring now to FIG. 5, there is illustrated the downlink interfering cell 112g and the small cell 112w wherein a cell border 502 of downlink interfering cell is reduced in size (see new cell border 502') to improve the speech quality in the small cell. The "high" downlink interference detected in the small cell 112w is regarded to be due to mobile terminal(s) (e.g., mobile terminals 506 and 508) located in the downlink interfering cell 112g. The reason is that mobiles located on a non-BCCH frequency in cell 112g will cause non-negligible downlink interference in cell 112w (assuming that the same frequency is used in both cells) regardless of where in cell 112g the mobiles are located. Please note that the BCCH frequency of cell 112g will always cause interference in co-channel cells as it always is transmitted on full power.

As compared to the uplink case of FIG. 4, the entire downlink interfering cell 112g is decreased in size to reduce interference within the small cell 112w because the downlink interference is the same (except for power control effects) regardless of where the mobile terminals 506 and 508 are located in the downlink interfering cell 112g. The power control effects mean that the mobile terminal(s) 506 located close to the border 502 of the downlink interfering cell 112g probably cause(s) the most downlink interference because the BTS 125g typically transmits with more power to those mobile terminals. Therefore by reducing the size of the downlink interfering cell 112g, the traffic load within the downlink interfering cell is reduced by transferring traffic load to neighboring cell(s) (e.g., neighboring cell 112r) and some of the non-BCCH traffic channels become idle so as to not generate additional downlink interference.

Furthermore it should be understood that instead of decreasing the size of downlink interfering cell 112g, the hierarchical cell structure threshold value of the downlink interfering cell can be adjusted to increase the handovers of ongoing calls to another cell (e.g., large cell 110b) in a different hierarchical layer of the cellular communications network 100.

In addition to decreasing the size of the downlink interfering cell 112g to improve the speech quality in the small cell 112w, the channels associated with the BCCH can be allocated as a first choice at handover and call setup within the interfering cell to achieve a further improvement in the speech quality of the small cell 112w.

Figure 6:
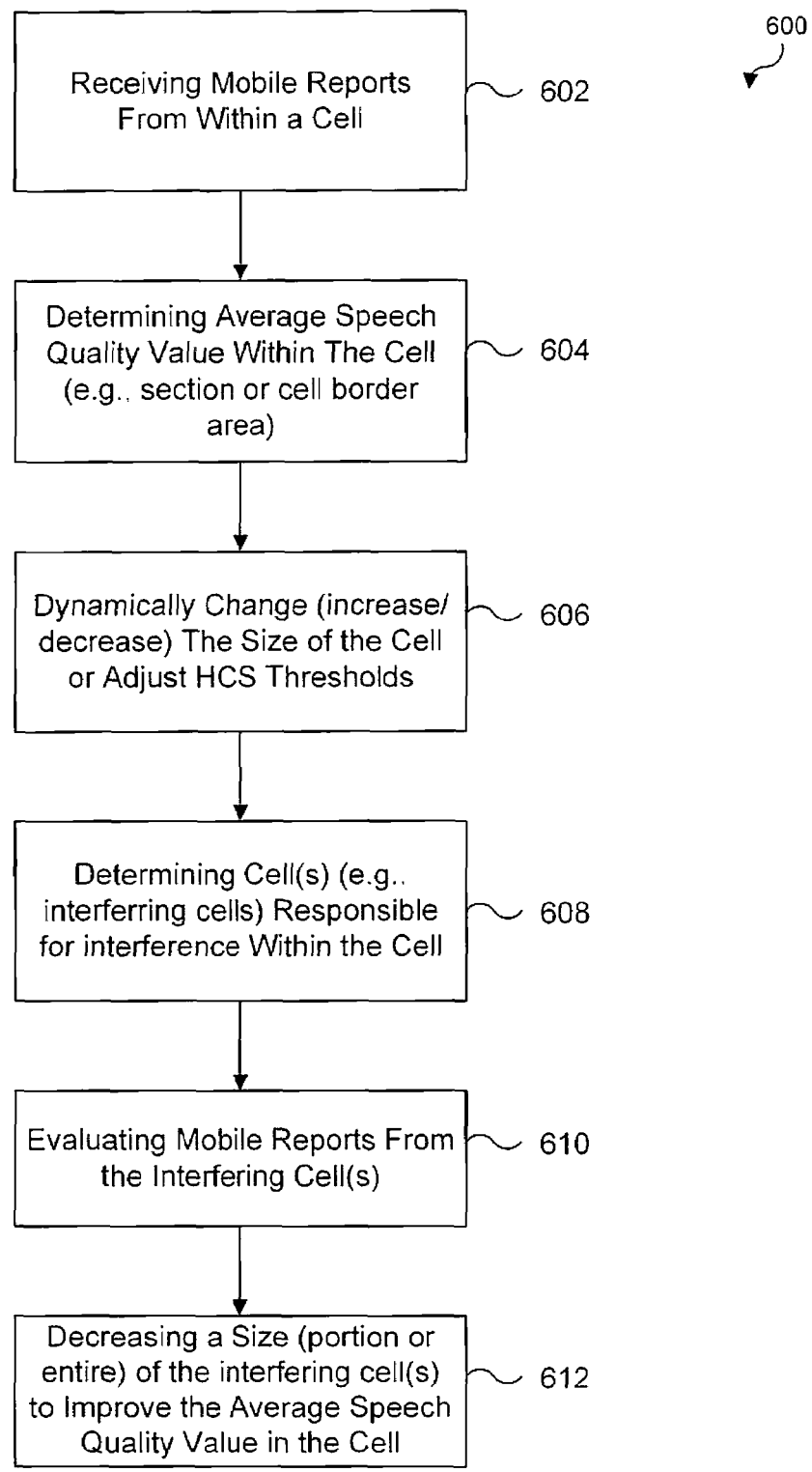
FIG. 6 is a simplified flow diagram of the preferred method used to change the size of the cell and interfering cell of the cellular communications network of FIG. 1.

Referring to FIG. 6, there is illustrated a simplified flow diagram of the method 600 used to control the speech quality within the cellular communication net-work 100 by changing the size of the small cell 112w and the interfering cells 112g and/or 112m (optional). Beginning at step 602 of the method 600, the BSC-1 150 (for example) receives the mobile reports from the BTS 125W and a preselected set of mobile terminals 130 located in the cell border area 208 (FIG. 2) or the section 210 (FIG. 3) of the small cell 112w.

At step 604 and in response to receiving the mobile reports, the BSC-1 150 functions to determine an average (downlink and/or uplink) speech quality value within the section 206 or the cell border area 208 of the small cell 112w. It should be understood that a minimum number of mobile reports may be required before enabling the dynamic changes to occur in the small cell 112w or the interfering cell(s) 112g or 112m so as to not move the borders unnecessarily.

At step 606, the BSC-1 150 then operates to dynamically change the size of the portion (e.g., section 206 or the cell border area 208) of the small cell 112w by moving the cell border inward when a lower threshold exceeds the average speech quality measure, and moving the cell border outward when the average speech quality value exceeds an upper threshold. More specifically, the BSC-1 150 operates to dynamically change (decrease/increase) the size of the small cell 112w by adjusting at least one border offset parameter or by adjusting a hierarchical cell structure threshold value of the small cell to increase or decrease the handovers of ongoing calls to another cell (e.g., large cell 110c) in a different hierarchical layer of the cellular communications network 100.

At step 608, the BSC-1 150 functions to monitor the interfering cells (e.g., interfering uplink cell 112m and/or interfering downlink cell 112g) that interfere with the small cell 112w. And, then at step 610, the BSC-1 150 evaluates the mobile reports from the mobile terminals (e.g., mobile terminals 406, 506 and 508) located in the interfering cell(s) 112m and 112g.

At step 612, the BSC-1 150 operates to decrease the size of the interfering cell 112m and/or 112g to improve the average speech quality value in the small cell 112w. More specifically, the BSC-1 150 functions to decrease the section 402 (FIG. 4) or entire cell border 502 (FIG. 5) of the interfering cells 112m and 112g by adjusting at least one border offset parameter or by adjusting a hierarchical cell structure threshold value of the interfering cell(s) to increase handovers of ongoing calls to another cell (e.g., large cells 110b and 110d) in a different hierarchical layer of the cellular communications network 100.

It should be understood that generally step 612 can be completed only if step 606 has not made the speech quality to return to "normal" quality values.

In addition, the present invention can work in conjunction with the related Patent Application entitled "Cellular Communications Network and Method for Maintaining Speech Quality by Controlling the Admission of a New Call". For example, when the admission control method of the related patent application prohibits the admission of a new call into a cell then either the cell or another cell in a defined interference area of the cell will have too low a level of speech quality. Therefore, the cell can decrease in size to improve the speech quality using the present invention. And, when the speech quality is "good" enough in the cell then that cell can once again start to accept new calls. In other words, the present invention actively attempts to eliminate "bad" speech quality and, thus, operates to limit the time the related invention inhibits new calls.

From the foregoing, it can be readily appreciated by those skilled in the art that the present invention provides a method and cellular communications network that improves the speech quality near a border of a cell by dynamically increasing or decreasing the size of the cell. Also, the cellular communications network and method as disclosed can operate to dynamically decrease the size of an interfering cell to increase the speech quality within a cell that was interfered with by the interfering cell.

Although one embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving speech quality in a cellular communications network, said method comprising the steps of:
   selecting a cell from a plurality of cells forming the cellular communications network;
   evaluating a first plurality of mobile reports received from mobile terminals located within a border area of the cell;
   determining, in response to evaluating the first plurality of mobile reports, a speech quality value within a portion of the cell along the border area; and
   adjusting a hierarchical cell structure threshold value of the cell to increase handovers of ongoing calls to another cell in a different layer of the cellular communications network, wherein the step of adjusting further includes:
      decreasing the portion of the cell when a lower threshold exceeds the speech quality value; or
      increasing the portion of the cell when the speech quality value exceeds an upper threshold.

2. The method of claim 1, wherein said step of decreasing the portion of the cell further includes adjusting at least one border offset parameter to reduce a size of the portion of the cell.

3. The method of claim 1, wherein said step of increasing the portion of the cell further includes adjusting at least one border offset parameter to increase a size of the portion of the cell.

4. The method of claim 1, wherein said step of increasing the portion of the cell further includes adjusting a hierarchical cell structure threshold value of the cell to decrease handovers of ongoing calls to another cell in a different layer of the cellular communications network.

5. The method of claim 1, wherein said portion of the cell further includes a cell border area or a section of the cell border area.

6. The method of claim 1, further comprising the steps of:
   determining an interfering cell from the plurality of cells, said interfering cell causes interference within said cell;
   evaluating a second plurality of mobile reports; and
   decreasing a portion of the interfering cell to improve the speech quality value in the cell.

7. The method of claim 6, wherein said step of decreasing a portion of the interfering cell further includes adjusting at least one border offset parameter to reduce a size of the portion of the interfering cell, said portion of the interfering cell includes a cell border area or a section of the cell border area.

8. The method of claim 7, wherein said step of adjusting at least one border offset parameter further includes determining a strongest neighbor cell adjacent to the section of the interfering cell to be reduced in size.

9. The method of claim 6, wherein said step of decreasing a portion of the interfering cell further includes adjusting a hierarchical cell structure threshold value of the interfering cell to increase handovers of ongoing calls to another cell in a different layer of the cellular communications network, said portion of the interfering cell includes a cell border area or a section of the cell border area.

10. The method of claim 1, further comprising the steps of: determining an interfering cell from the plurality of cells, said interfering cell causes interference within said cell; and
    allocating a channel during a call setup or handover on a Broadcast Control Channel frequency used within the interfering cell to improve the speech quality value in the cell.

11. A method for improving speech quality in a cellular communications network, said method comprising the steps of:
    selecting a cell from a plurality of cells forming the cellular communications network;
    receiving a first plurality of mobile reports from a first transceiver located in the cell and from a corresponding number of first mobile terminals located in a portion of the cell and within a predetermined distance from a border of a non-coisted cell, said portion of the cell including a cell border area or a section of the cell border area;
    determining, in response to receiving the first plurality of mobile reports, an average speech quality value of the portion of the cell;
    dynamically changing the portion of the cell by decreasing the portion when a lower threshold exceeds the average speech quality value, and increasing the portion when the average speech quality value exceeds an upper threshold;
    determining an interfering cell from the plurality of cells, said interfering cell causes interference within said cell;
    receiving a second plurality of mobile reports from a second transceiver located in the interfering cell and from a corresponding number of second mobile terminals located in the interfering cell; and
    decreasing a portion of the interfering cell to improve the average speech quality value in the cell, said portion of the interfering cell including a cell border area or a section of the cell border area.

12. The method of claim 11, wherein said step of decreasing the portion of the cell further includes adjusting at least one border offset parameter to reduce a size of the portion of the cell, or adjusting a hierarchical cell structure threshold value of the cell to increase handovers of ongoing calls to another cell in a different layer of the cellular communications network.

13. The method of claim 11, wherein said step of increasing the portion of the cell further includes adjusting at least one border offset parameter to increase a size of the portion of the cell, or adjusting a hierarchical cell structure threshold value of the cell to decrease handovers of ongoing calls to another cell in a different layer of the cellular communications network.

14. The method of claim 11, wherein each of the first plurality of mobile reports further includes a plurality of downlink signal strengths and a downlink speech quality value determined at one of the first plurality of mobile terminals, and an uplink signal strength and an uplink speech quality value determined at the first transceiver.

15. The method of claim 11, wherein said step of decreasing a portion of the interfering cell further includes adjusting at least one border offset parameter to reduce a size of the portion of the interfering cell, or adjusting a hierarchical cell structure threshold value of the interfering cell to increase handovers of ongoing calls to another cell in the different layer of the cellular communications network.

16. The method of claim 15, wherein said step of adjusting at least one border offset parameter further includes determining a strongest neighbor cell adjacent to the section of the interfering cell to be reduced in size.

17. A cellular communications network comprising:
a cell;
a first transceiver station located within the cell;
a first plurality of mobile terminals located in a portion of said cell and within a border area of the cell, said portion includes the cell border area or a section of the cell border area; and
a controller for receiving a first plurality of mobile reports, said controller further including:
means for determining an average speech quality value of the portion of the cell along the border area in response to receiving the first plurality of mobile reports; and
means for adjusting a hierarchical cell structure threshold value of the cell to increase handovers of ongoing calls to another cell in a different layer of the cellular communications network, wherein the adjusting means further includes:
means for decreasing the portion of the cell when a lower threshold exceeds the average speech quality value; or
means for increasing the portion of the cell when the average speech quality value exceeds an upper threshold.

18. The cellular communications network of claim 17, wherein said means for decreasing the portion of the cell further includes means for adjusting at least one border offset parameter to reduce a size of the portion of the cell.

19. The cellular communications network of claim 17, wherein said means for increasing the portion of the cell further includes means for adjusting at least one border offset parameter to increase a size of the portion of the cell.

20. The cellular communications network of claim 17, wherein said means for increasing the portion of the cell further includes means for adjusting a hierarchical cell structure threshold value of the cell to decrease handovers of ongoing calls to another cell in a different layer of the cellular communications network.

21. The cellular communications network of claim 17, further comprising:
an interfering cell that causes interference within said cell;
a second transceiver station located within the interfering cell;
a second plurality of mobile terminals located within the interfering cell; and
said controller for receiving a second plurality of mobile reports, said controller further includes means for decreasing a portion of the interfering cell to improve the average speech quality value in the cell, said portion of the interfering cell includes a cell border area or a section of the cell border area.

22. The cellular communications network of claim 21, wherein said means for decreasing the portion of the interfering cell further includes means for adjusting at least one border offset parameter to reduce a size of the portion of the interfering cell.

23. The cellular communications network of claim 22, wherein said means for adjusting at least one border offset parameter further includes means for determining a strongest neighbor cell adjacent to the section of the interfering cell to be reduced in size.

24. The cellular communications network of claim 21, wherein said means for decreasing the portion of the interfering cell further includes means for adjusting a hierarchical cell structure threshold value of the interfering cell to increase handovers of ongoing calls to another cell in a different layer of the cellular communications network.

25. The cellular communications network of claim 17, further comprising an interfering cell that causes interference within said cell, said controller further includes means for allocating a channel during a call setup or handover on a Broadcast Control Channel frequency used within the interfering cell to improve the average speech quality value in the cell.

* * * * *